(No Model.) 2 Sheets—Sheet 1.
A. L. TUCKER.
APPARATUS FOR PRODUCING SCENIC EFFECTS.
No. 563,334. Patented July 7, 1896.
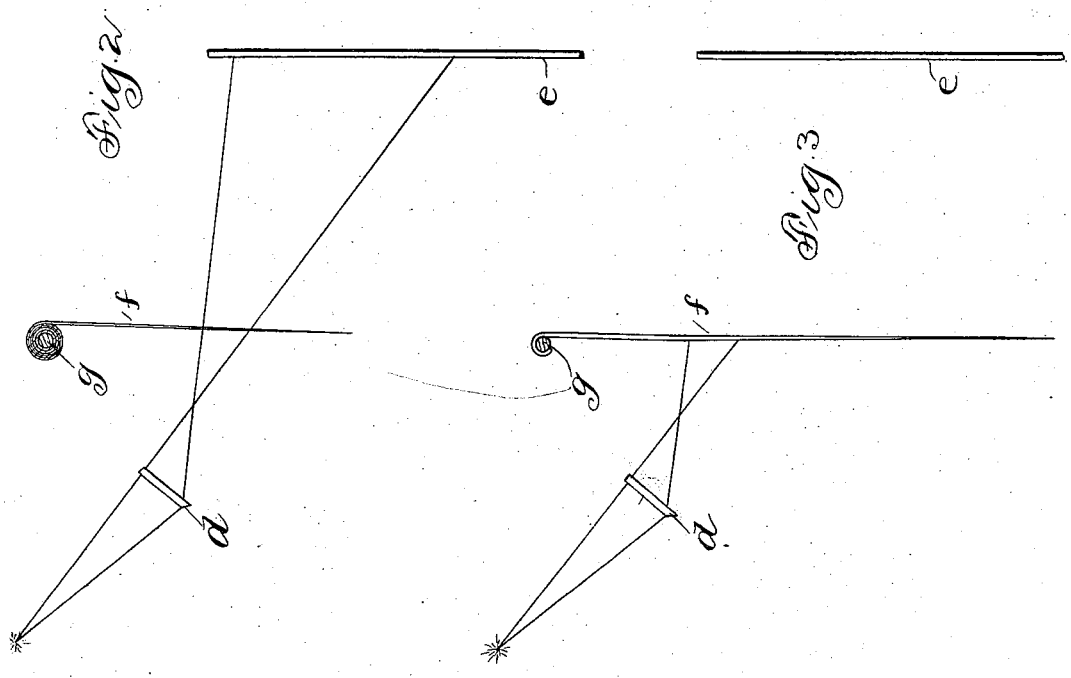
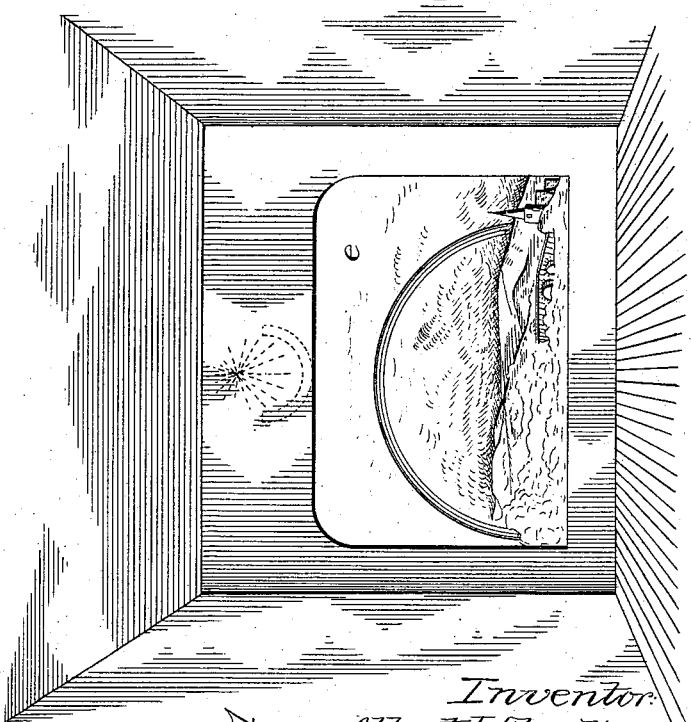
Witnesses:
George L. Cragg
W Clyde Jones.
Inventor:
Albert L. Tucker.
By Barton & Brown
Attys

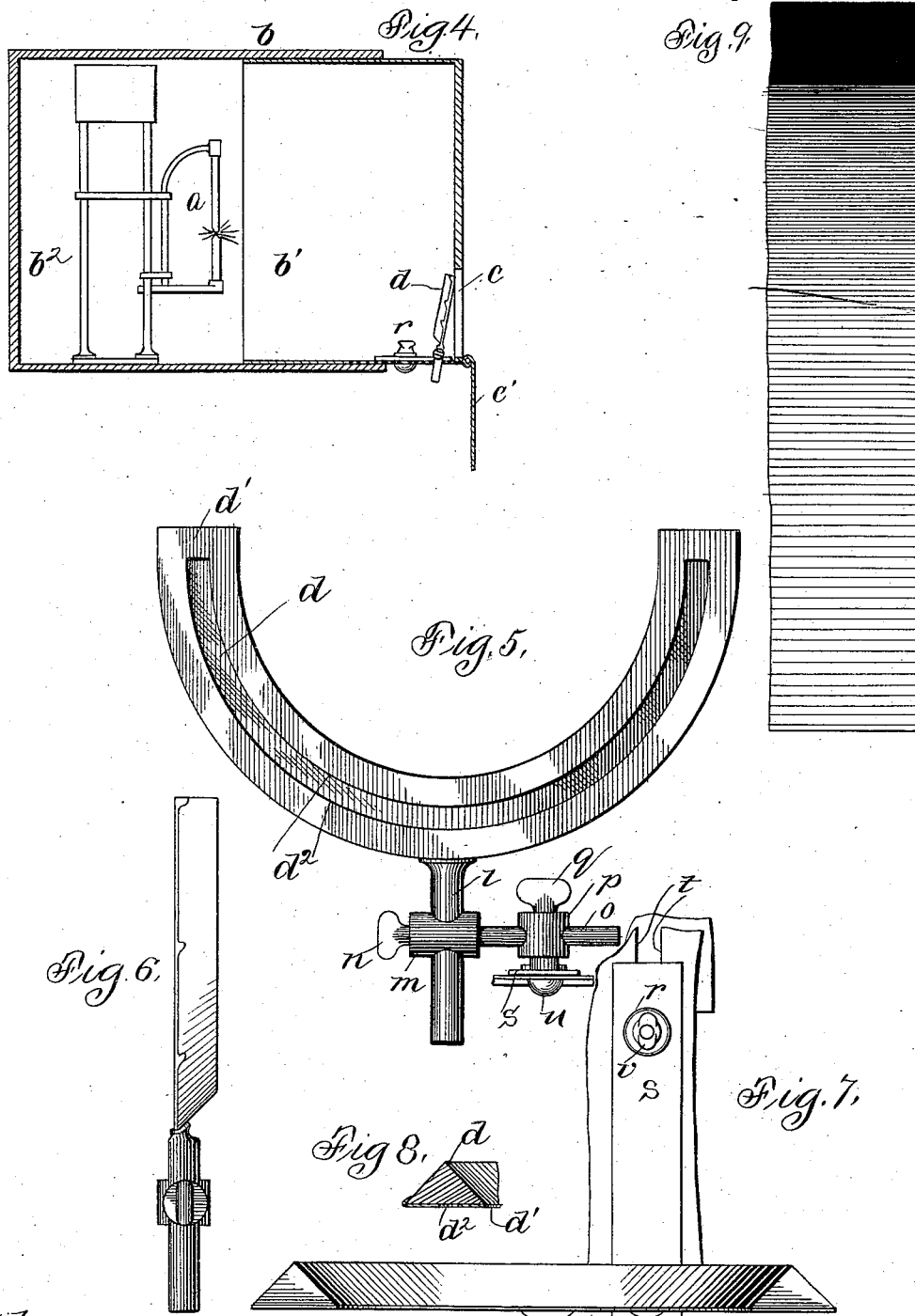

UNITED STATES PATENT OFFICE.

ALBERT L. TUCKER, OF CHICAGO, ILLINOIS, ASSIGNOR TO THE WESTERN ELECTRIC COMPANY, OF SAME PLACE.

APPARATUS FOR PRODUCING SCENIC EFFECTS.

SPECIFICATION forming part of Letters Patent No. 563,334, dated July 7, 1896.

Application filed March 13, 1893. Renewed July 29, 1895. Serial No. 557,510. (No model.)

*To all whom it may concern:*

Be it known that I, ALBERT L. TUCKER, a citizen of the United States, residing at Chicago, in the county of Cook and State of Illinois, have invented a certain new and useful Improvement in Apparatus for Producing Scenic Effects, (Case No. 1,) of which the following is a full, clear, concise, and exact description, reference being had to the accompanying drawings, forming a part of this specification.

My invention relates to apparatus for producing scenic effects in spectacular displays, its object being particularly to represent upon a scene a rainbow of natural appearance.

It is well known that the distribution of colors as found in the rainbow may be produced by transmitting a beam of light through a transparent refracting-prism, and that a suitable curved or bow form of the band of colors thus produced may be obtained by employing a properly-curved prism. Hitherto, however, the uneven and varying intensity of illumination observed in the natural bow has not been represented artificially.

My invention aims to produce in the scenic bow a gradual decrease of illumination from the lower extremities of the bow toward the upper portion, and to preserve the relative illuminations of the different portions unchanged while increasing the intensity of illumination of the whole bow, as observed in nature. For this purpose in my invention I interpose an adjustable screen of gradually-decreasing transparency in the path of the light between the source of illumination and the scenic screen, the usual curved prism being also placed in the path of the light. Thus the light which produces, for instance, the upper portion of the bow, is compelled to pass through a much thicker part of the interposed screen than that producing its lower extremities, and the upper portion of the bow is correspondingly reduced in brightness. The screen being also adjustable so as to bring into the path of the light a part of the screen of any desired degree of transparency or translucency, the operator is enabled to increase the illumination of the scenic bow from complete obscurity to the full illumination of the source of light.

I have illustrated my invention in the accompanying drawings and will describe it in greater detail in connection therewith.

Figure 1 is a front view of a scenic screen with the rainbow effect produced by my apparatus illustrated thereon. In this view the lens and source of light are shown diagrammatically by dotted lines. Fig. 2 is a diagrammatic illustration showing the focus of light and the disposition of the rays emanating therefrom. In this view the lower portion of the wedge-shaped screen or curtain before mentioned, which is almost perfectly transparent, is shown interposed between the prismatic lens and the scenic screen. Fig. 3 is an illustration similar to Fig. 2, with the thick portion of the curtain interposed between the lens and the scenic screen. The light is absorbed by this portion of the curtain and is prevented thereby from striking the scenic screen. Fig. 4 is a view of a complete apparatus which I preferably use. Fig. 5 is a front elevation of the prismatic lens. Figs. 6 and 7 are side and top views, respectively, of the prismatic lens. Fig. 8 is a right cross-section of the prism. Fig. 9 is a front view of another form of curtain which may be used to intercept the rays of light.

Like parts are indicated by similar letters of reference throughout all of the views.

In Fig. 4 a source of light $a$, preferably a focusing arc-lamp, is shown inclosed in a suitable chamber or box $b$, having an opening $c$ in one of its walls. A lid $c'$ is provided in front of this opening to prevent the emission of light when desired. Before the opening $c$ is placed a curved prism $d$. (Shown more clearly in Figs. 5, 6, 7, and 8.) The prism may be of triangular section and curved to form a semicircle. Upon the back of the prism is mounted a plate $d'$, of metal, having a semicircular slot $d^2$ cut through it. This plate serves as a protection to the base of the prism, and the slot cut through it limits the amount of light which is cast upon the screen.

In their manufacture it is difficult to make prisms of sufficiently small cross-section to cast approximately perfect bows. By means of the semicircular slot $d^2$ cut in the plate $d'$ a prism of larger cross-section may be employed, which will produce the desired effect.

By the use of the plate $d'$ any ill effects which would be produced by broken or uneven edges on the base of the prism are avoided.

A scenic screen or curtain $e$ is disposed in proper position to receive the curved spectrum formed by the beam of light passing from the chamber. In the path of the light may be placed a screen or curtain $f$, which is made vertically adjustable by being mounted upon a roller $g$, or in any other suitable manner. The screen $f$, as shown, is of wedge-shaped cross-section, as indicating varying opacity; but obviously this characteristic might be obtained in other ways than by constructing the screen of varying thickness. I find that a screen especially suitable for the purpose may be built up of many folds of a thin or fine-woven textile fabric, the different folds decreasing in length consecutively from the bottom toward the top or thicker portion of the screen. Thus the lower extremity of the screen would consist of only a single sheet of the fabric, which would be almost transparent, while the upper part would comprise many thicknesses of the cloth, and would thus be practically opaque.

Other screens may be constructed, as, for instance, as shown in Fig. 9, wherein I have shown a part of a plate of any normally transparent substance, as glass, covered with blending tints of paint. A very light tint is put upon the bottom, which is gradually deepened until at the top portion of the plate of transparent substance the paint is thick enough to absorb, practically, all of the light that strikes it. If glass is employed, the same effect may be produced by properly grinding one of its surfaces, preferably that which is immediately opposed to the prismatic lens.

In the operation of my device, the curtain $f$ is at first lowered until the light emerging from the slot $d^2$ is entirely obstructed. Then as the curtain $f$ is raised a little, the prismatic band of light, being least obstructed at the lower points at which it strikes the curtain $f$, produces upon the screen $e$ two short and dim spectra, which appear as the lower extremities of the bow. Then as the curtain $f$ is is gradually raised the proportion of light obstructed by the curtain $f$ grows continually less. The continually-increasing portions of the bow are thus caused to become visible until the complete semicircle is presented, the lower portions or extremities of the bow remaining most fully illuminated, however, until the curtain $f$ is entirely withdrawn.

I will now describe the portion of the apparatus which produces the spectra more in detail.

Referring to Fig. 4, the chamber $b$ is made up of two sections $b'$ $b^2$, section $b$ of which telescopes within section $b^2$. By pushing section $b'$ toward the focus of light a bow of greater diameter is formed. By withdrawing section $b'$ from the focus of light a bow of smaller diameter is formed. The prismatic lens $d$ is placed in the compartment $b'$ below its diameter.

Figs. 2 and 3 show the manner in which the rays upon leaving the bottom of the prism are deflected toward the top of the screen, and the manner in which the rays upon leaving the top of the prism are deflected toward the bottom of the screen.

Referring to Figs. 5, 6, and 7, a finer adjustment of the prismatic lens to the focus of light may be had by means of the method of mounting the same which I employ.

Attached to the plate $d'$ is a rod $l$, which passes through an aperture in the support $m$. Vertical adjustment of the prism $d$ may be had by means of the set-screw $n$. Fixedly attached to the support $m$ is another rod $o$, which passes through another support $p$. In the adjustment of the prism to the light a line drawn from the focus of light to the center of the semicircle which bounds the prism should be perpendicular to the plane coincident with said circle. By means of the set-screw $q$ this adjustment may be had.

The distance between the focus and the prism may be adjusted by means of a binding-screw $r$, which is mounted upon a strip $s$, upon which is also mounted a support $m$, before mentioned. This screw passes through a longitudinal slot $t$, cut in the bottom of section $b'$, and terminates in a head $u$ beneath said bottom. By loosening the screw-cap $v$ the strip $s$ and the prism supported thereon may be moved from or toward the focus of light, and such adjustment made secure by tightening the screw-cap.

Obviously my invention is not limited in its application to the production of an artificial rainbow which shall thus gradually become visible, but may, with slight variation, be employed in the production of landscapes or other scenes, to cause them to come gradually into view.

What I claim as new, and desire to secure by Letters Patent, is—

In an apparatus for producing scenic effects, the combination with a chamber, of a curved prismatic lens and a source of light contained therein, a scenic screen adapted to receive the spectra cast by said lens, means for adjusting the said lens with relation to the source of light and the scenic screen, a curtain of varying degrees of translucency adapted to be interposed between said prismatic lens and the aforesaid scenic screen; substantially as and for the purpose specified.

In witness whereof I hereunto subscribe my name this 7th day of March, A. D. 1893.

ALBERT L. TUCKER.

Witnesses:
W. CLYDE JONES,
GEORGE L. CRAGG.